US010384626B2

(12) United States Patent
Salter et al.

(10) Patent No.: US 10,384,626 B2
(45) Date of Patent: Aug. 20, 2019

(54) VEHICLE POWER PLUG CONVERTER

(71) Applicant: Ford Global Technologies, LLC, Dearborn, MI (US)

(72) Inventors: Stuart C. Salter, White Lake, MI (US); Cornel Lewis Gardner, Romulus, MI (US); Benjamin Yilma, Canton, MI (US); Matthew M. Olson, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 15/232,286

(22) Filed: Aug. 9, 2016

(65) Prior Publication Data

US 2018/0043846 A1 Feb. 15, 2018

(51) Int. Cl.
| | |
|---|---|
| *B60R 16/03* | (2006.01) |
| *H01R 13/70* | (2006.01) |
| *H01R 24/38* | (2011.01) |
| *H01R 24/62* | (2011.01) |
| *H01R 31/06* | (2006.01) |
| *H01R 107/00* | (2006.01) |

(52) U.S. Cl.
CPC ............ *B60R 16/03* (2013.01); *H01R 13/70* (2013.01); *H01R 24/38* (2013.01); *H01R 24/62* (2013.01); *H01R 31/065* (2013.01); *H01R 2107/00* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 5,661,346 A | 8/1997 | Budzyn et al. | |
| 2008/0023306 A1 | 1/2008 | Jodoin et al. | |
| 2008/0227426 A1 | 9/2008 | Lin | |
| 2011/0148352 A1* | 6/2011 | Wang | B60R 11/0241 |
| | | | 320/108 |

(Continued)

FOREIGN PATENT DOCUMENTS

| | | |
|---|---|---|
| CN | 204835643 U | 12/2015 |
| WO | WO 2017/031115 A1 | 2/2017 |

OTHER PUBLICATIONS

Search Report dated Feb. 12, 2018 for GB Patent Application No. 1712658.2 (4 pages).

(Continued)

*Primary Examiner* — Jared Fureman
*Assistant Examiner* — Aqeel H Bukhari
(74) *Attorney, Agent, or Firm* — Frank Lollo; Neal, Gerger & Eisenberg LLP; James P. Muraff

(57) ABSTRACT

Apparatus, systems, and methods are disclosed for a vehicle power plug converter. An example disclosed plug-in converter for a vehicle power socket includes a wireless node, a plug, a switch, an accessory power socket and a controller. The example a wireless node wirelessly receives service messages. The example plug is configured to plug into the vehicle power socket. The example switch is between the plug and the accessory power socket. Additionally, the example controller, in response to receiving the service messages, closes the switch to electrically couple the plug and the accessory power socket.

14 Claims, 4 Drawing Sheets

(56) References Cited

U.S. PATENT DOCUMENTS

| | | | |
|---|---|---|---|
| 2011/0320636 A1* | 12/2011 | Young | H04W 88/16 |
| | | | 709/249 |
| 2013/0234534 A1* | 9/2013 | Lin | H02J 13/0075 |
| | | | 307/112 |
| 2013/0261821 A1* | 10/2013 | Lu | H04L 12/2807 |
| | | | 700/289 |
| 2014/0074317 A1 | 3/2014 | Tesler | |
| 2015/0149034 A1* | 5/2015 | Nordstrom | B60L 1/006 |
| | | | 701/36 |
| 2015/0183386 A1 | 7/2015 | Tiemann | |
| 2016/0044447 A1* | 2/2016 | Tetreault | G01K 1/024 |
| | | | 455/41.1 |

OTHER PUBLICATIONS

*Modifying an Automotive 12V Power Outlet to Disable Power When Car Is Off*, Jan. 2013, 2 Pages.

\* cited by examiner

VEHICLE POWER PLUG CONVERTER

TECHNICAL FIELD

The present disclosure generally relates to vehicle power buses and, more specifically, a vehicle power plug converter.

BACKGROUND

Vehicles include 12 volt (V) power ports in various locations around the vehicle, such as on the infotainment head unit. Traditionally, these power ports are connected to a power bus that is "continuous"; that is, the power ports receive power when the vehicle ignition is off. Drivers may forget to unplug accessories, such as phones, dash cameras, GPS, or RADAR detector. As a result, the battery of the vehicle may drain while the driver is away.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a vehicle power plug converter. An example disclosed plug-in converter for a vehicle power socket includes a wireless node, a plug, a switch, an accessory power socket and a controller. The example a wireless node wirelessly receives service messages. The example plug is configured to plug into the vehicle power socket. The example switch is between the plug and the accessory power socket. Additionally, the example controller, in response to receiving the service messages, closes the switch to electrically couple the plug and the accessory power socket.

An example disclosed system includes a vehicle and a plug-in converter. The example vehicle includes a first wireless node electrically coupled to a first vehicle power bus, and a first power socket electrically coupled to a second vehicle power bus. The example plug-in converter is configured to plug into the first power socket. Additionally, the example plug-in converter includes a second wireless node, a switch, and a controller to, in response to receiving service messages, close the switch to electrically couple a plug and a second power socket.

An example disclosed method to manage power to a device electrically coupled to a first power bus of a vehicle includes, in response to receiving a service message from a wireless node electrically coupled to a second power bus to the vehicle, providing a first signal to a switch between the first power bus and the device. The first signal causes the switch to be in a closed state. Additionally, the example method includes, in response to not receiving the service message for a threshold period of time, providing a second signal to the switch. The second signal causes the switch to be in an open state.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
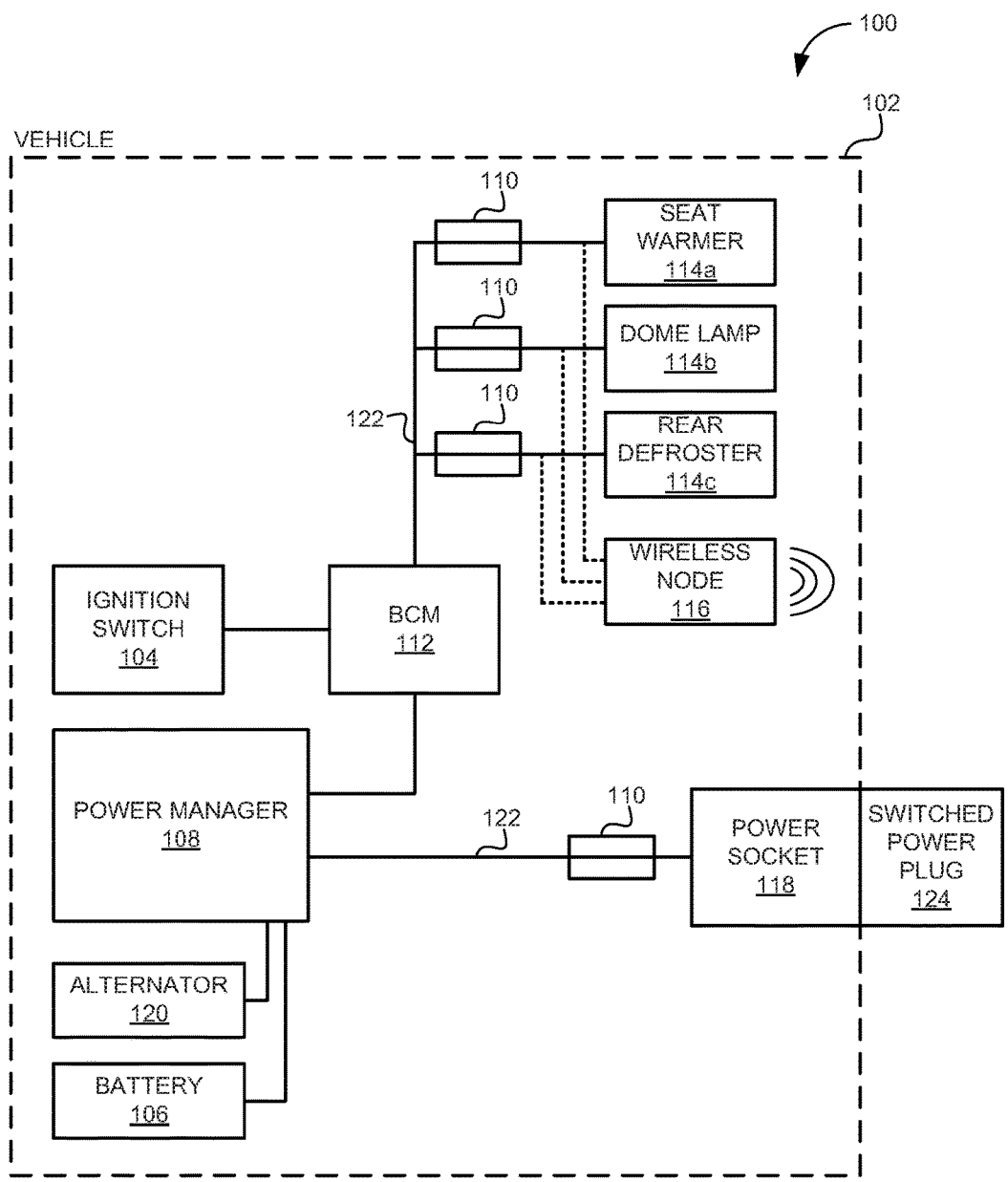
FIG. 1 is a block diagram of electronics of a vehicle in accordance with the teaching of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicle subsystems are connected to a direct current (DC) power bus. The power bus is supplied by an alternator and a battery. When the engine is running, the alternator supplies power to the DC power bus through a power regulator. Additionally, when the alternator cannot supply enough current to meet the current demand (e.g., when the engine is off), the DC power is supplied by the battery. Thus, the power bus supplies power even when vehicle of off. As used herein, "continuous power" refers to power that is available when the ignition switch of the vehicle is set to off. Several vehicle subsystems (e.g., a sound system, lights, etc.) receive power when the ignition switch is set to the accessory power ("ACC") position or the on position. As used herein "ignition power" refers to power that is available when the ignition switch of the vehicle is set to ACC or on. Additionally, several vehicle subsystems (e.g., the interior lights, rear defroster, seat warmers, etc.) receive power for a limited time period (e.g., five minutes, ten minutes, etc.) after the ignition switch is set to off. As used herein, "delayed accessory power" refers to power that is available for a limited time period after the ignition switch is set to off. A body control module monitors and controls various subsystems of the vehicle. For example, the body control module may control power windows, power locks, an immobilizer system, and/or power mirrors, etc. Additionally, the body control module controls the ignition power and the delayed accessory power.

As disclosed below, a switched power plug is insertable into a power port of the vehicle. The power port receives continuous power from the power bus. A vehicle wireless node is electrically coupled to a vehicle subsystem (e.g., the sound system, the done light, the rear defroster, etc.) that receives ignition power or delayed accessory power via the body control module. In such a manner, the vehicle wireless node receives power when the corresponding subsystem receives power. While receiving power, vehicle wireless node periodically broadcasts a service message. The switched power plug includes a switch wireless node that communicably couples with the vehicle wireless node. The switched power plug supplies power into an accessory (e.g., phones, dash cameras, GPS, or RADAR detector) electrically coupled to the switched power plug based on the service messages. The switched power plug switches off the power to the accessory after not receiving the service message for a threshold period of time (e.g. three times the period that the vehicle wireless node broadcasts the service message, etc.). For example, if the vehicle wireless node broadcasts the service message every 15 seconds, the switched power plug may switch off the power to the accessory after not receiving the service message for 45 seconds. Additionally, the switched power plug supplies power to the accessory upon receiving the service message.

FIG. 1 is a block diagram of electronics 100 of a vehicle 102 in accordance with the teaching of this disclosure. The vehicle 102 may be a standard gasoline powered vehicle, a hybrid vehicle, an electric vehicle, a fuel cell vehicle, and/or any other mobility implement type of vehicle. The vehicle 102 includes parts related to mobility, such as a powertrain with an engine, a transmission, a suspension, a driveshaft, and/or wheels, etc. Additionally, the vehicle 102 may be non-autonomous, semi-autonomous or autonomous. In the illustrated example, the vehicle 102 includes an ignition switch 104, a battery 106, a power manager 108, fuses 110, a body control module 112, accessories 114a-114c, a wireless node 116, and a power socket 118. In the illustrated example, the vehicle 102 includes an alternator 120. Alternatively in some examples, some vehicles 102 (e.g. electric vehicles, etc.) may not have the alternator 120, but instead have a larger battery 106.

The ignition switch 104 is electrically coupled to a starter motor (not shown) an electric drive motor. In some examples, the ignition switch 104 is configured to receive a key. Alternatively or additionally, in some examples, the ignition switch 104 may be coupled to a passive entry-passive start system that facilitates operation of the ignition switch 104 without inserting a key. The ignition switch 104 has an off position and an on position. Additionally, in some examples, the ignition switch 104 has an accessory power position (sometimes referred to as "ACC").

The battery 106 may be any suitable battery to provide power to the vehicle 102. For example, the battery 106 may be an acid-lead battery or a lithium-ion battery. The battery 106 supplies power when the ignition switch 104 is set to off or ACC, or when the alternator 120 does not supply enough current. When the vehicle 102 is an electric or hybrid vehicle, the battery 106 may be the primary source of power. In some examples, the alternator 120 supplies AC current based on the revolutions per minute (RPM) of the engine. The power manager 108 regulates the current and voltage from the battery 106 and/or the alternator 120. In the illustrated example, the power manager 108 supplies the regulated power to the body control module 112 and the power socket 118 via one or more power buses 122 of the vehicle 102. In some examples, the power manager 108 controls recharging the battery 106 using excess current generated by the alternator 120. In the illustrated example, the power buses 122 include fuses 110 that protect the electrical systems of the vehicle 102.

The body control module 112 controls various subsystems of the vehicle 102. For example, the body control module 112 may control power windows, power locks, an immobilizer system, and/or power mirrors, etc. The body control module 112 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control module 112 is communicatively coupled to input controls within the vehicle 102, such as power window control buttons, power lock buttons, etc. The body control module 112 instructs the subsystem to act based on the corresponding to the actuated input control. For example, if the driver's side window button is toggled to lower the driver's side window, the body control module 112 instructs the actuator controlling the position of the driver's side window to lower the window. Additionally, the body control module 112 is electrically coupled to the ignition switch 104. The example body control module 112 includes one or more switches and a controller (e.g., a processor and/or a circuit, etc.) that controls the power received by the accessories 114a-114c. The body control module 112 controls the ignition power and the delayed accessory power.

The accessories 114a-114c control various subsystems in the vehicle 102 that receive ignition power and/or delayed accessory power from the vehicle 102. For examples, a dome light 114b may receive delayed accessory power that is on for ten minutes after the ignition switch 104 is set to off. As another example, a rear defroster 114c may receive ignition power that is on when the ignition switch is set to off or ACC.

The wireless node 116 includes hardware and firmware to implement a short-range wireless network, such as Bluetooth Low Energy (BLE). The BLE protocol is set forth in Volume 6 of the Bluetooth Specification 4.0 (and subsequent revisions) maintained by the Bluetooth Special Interest Group. In the illustrated example, the wireless node 116 is electrically coupled to the power bus associated via one of the accessories 114a-114c. Alternatively, in some examples, the wireless node 116 is electrically coupled to the body control module 112 to receive the ignition power or the delayed accessory power. When powered, the example wireless node 116 periodically (e.g., every ten seconds, every fifteen seconds, etc.) transmits a service message. The service message advertises that the wireless node 116 is receiving power.

The power socket 118 is a receptacle connector designed for receiving an electrical plug. The power sockets 118 may be located in various locations around the vehicle 102. For example, one power socket 118 may be embedded in an infotainment head unit and another power socket 118 may be embedded in back of a center armrest console accessible to the rear seats of the vehicle 102. In the illustrated example, the power socket(s) 118 receive continuous power from the power manager 108.

As discuss in connection with FIG. 2 below, a switched power plug 124 may be plugged into the power socket(s) 118. The switched power plug 124 is communicatively coupled to the wireless node 116. The switched power plug 124 provides power to a device electrically coupled to the switched power plug 124 while receiving the service message. After a period of time (e.g., three times the period of the service message, etc.) of not receiving the service message, the switched power plug 124 stops supplying power to the electrically coupled device. In such as manner, the switched power plug 124 converts the continuous power socket 118 into an ignition power or delayed accessory power socket.

Figure 2:
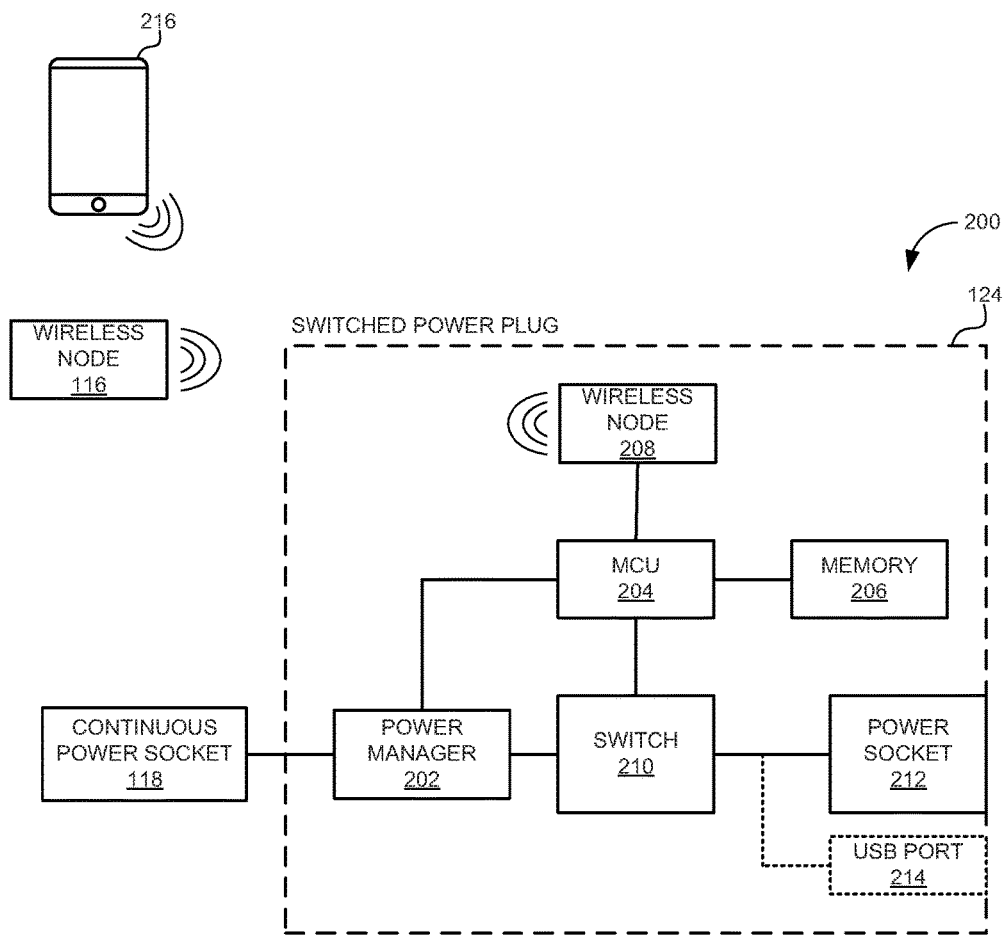
FIG. 2 is a block diagram of electronics of the switched power plug of FIG. 1.

FIG. 2 is a block diagram of electronics 200 of the switched power plug 124 of FIG. 1. The switched power plug 124 converts the continuous power socket 118 of FIG. 1 into an ignition power or delayed accessory power socket. In the illustrated example, the switched power plug 124 includes a power manager 202, a processor or controller 204, memory 206, a wireless node 208, a switch 210, and a power socket 212. In some examples, the switched power plug 124 also includes a universal serial bus (USB) port 214.

The example power manager 202 regulates voltage (e.g., 3.3V, 5V, etc.) to be used by the processor or controller 204, the memory 206, and the wireless node 208. Additionally, in some examples, the power manager 202 regulates voltage to the power socket 212 and/or the USB port 214. For example, the voltage from the continuous power socket 118 may be regulated from 14.3V to 12V for the power socket 212 and to 5V (e.g., at 1 A to 2.1 A, etc).

The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory. In some examples, the memory 206 may be integrated with the processor or controller 204.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The wireless node 208 hardware and firmware implements the same short-range wireless network as the wireless node 116 of the vehicle 102. The wireless node 208 is communicatively coupled to the processor or controller 204. Additionally, the wireless node 208 receives the service messages broadcast by the wireless node 116 of the vehicle 102. Additionally, in some examples, the wireless node 208 also pairs with a mobile device 216 (e.g., a smart phone, a smart watch, a tablet, etc.) that includes a wireless node.

The switch 210 has an open state and a closed state. When the switch 210 is in the open state, power is not supplied to the power socket 212. Conversely, when the switch 210 is in the closed state, power is supplied to the power socket 212. The switch 210 may be a power transistor. For example, the switch 210 may be an N-channel MOSFET where (a) the gate is electrically coupled to the processor or controller 204 to control the state of the switch 210, (b) the source is electrically coupled to the power manager 202, and (c) the drain is electrically coupled to the power socket 212. Alternatively, in some examples, the switch is a mechanical relay or a solid state relay (SSR).

The power socket 212 is configured to accept a 12V DC power plug that is designed to plug into the continuous power socket 118 of the vehicle 102. The USB port 214 may be any suitable female USB connector. For example, the USB port 214 may be a female USB A-type connector or a female USB C-type connector.

Figure 3:
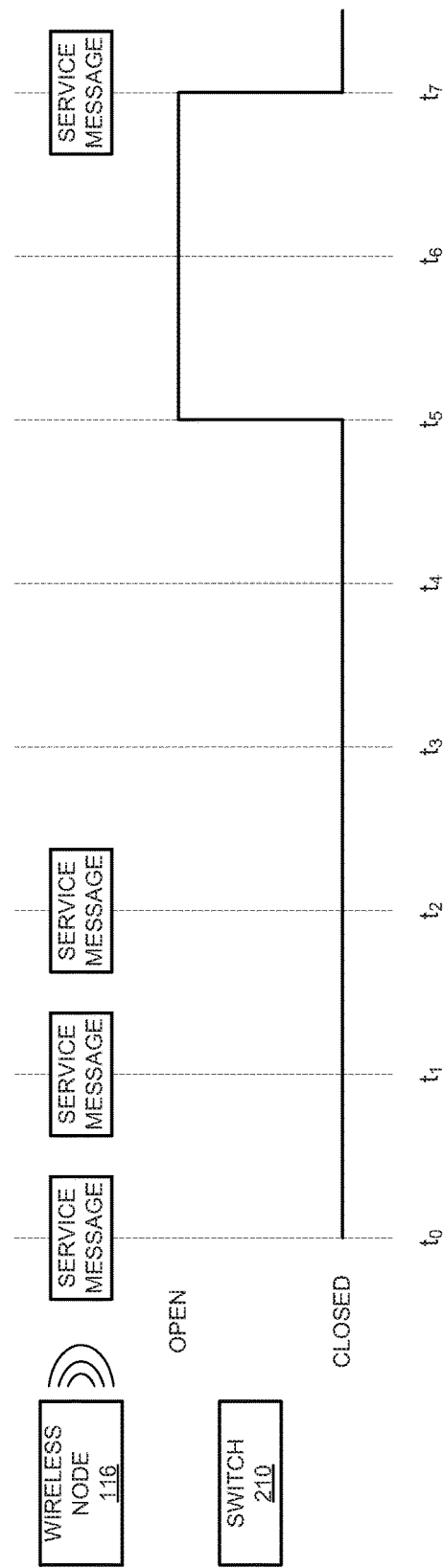
FIG. 3 depicts a timing diagram for the switched power plug of FIG. 1.

The processor or controller 204 controls the state of the switch 210 based on the service messages received from the wireless node 116 of the vehicle 102. Additionally, in some examples, the processor or controller 204 controls the state of the switch 210 based on the service messages from the mobile device. 216. In some such examples, an application executing on the mobile device may be activated to transmit the service messages. In such a manner, the device plugged into the switched power plug 124 may receive power when the ignition switch 104 is set to off when the application is activated by the user. For example, a dashboard camera receive power when the mobile device 216 is within range (e.g., 33 feet, etc.) of the wireless node 208 of the switched power plug 124, but does not receive power when mobile device moves past the range of the wireless node 208. As illustrated in the example of FIG. 3, upon receiving the service message, the processor or controller 204 closes the switch 210. The processor or controller 204 causes the switch 210 to remain closed until the service message is not received for a threshold period of time. The threshold period of time facilitates, for example, robust handling of timing differences between the wireless node 116 of the vehicle 102 and the processor or controller 204. In the illustrated example, the threshold period of time is three times the period in which the wireless node 116 of the vehicle 102 broadcasts the service message. For example, if the wireless node 116 of the vehicle 102 broadcasts the service message every ten seconds, the processor or controller 204 opens the switch after thirty seconds have elapsed without receiving the service message.

Figure 4:
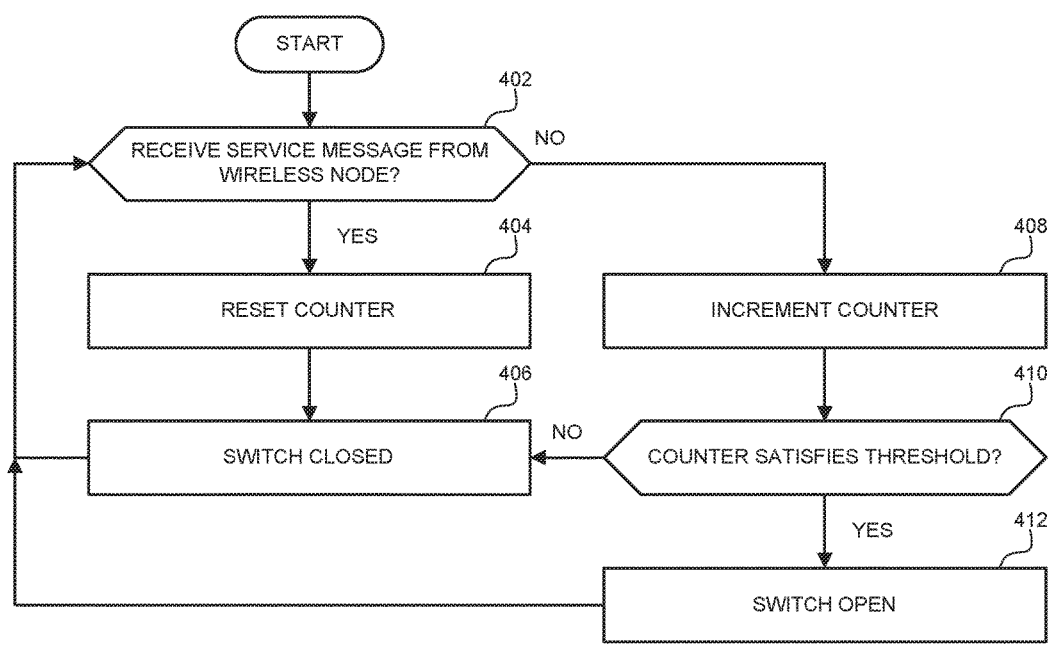
FIG. 4 is a flowchart of a method of operating the switched power plug of FIGS. 1 and 2.

FIG. 4 is a flowchart of a method of operating the switched power plug 124 of FIGS. 1 and 2. Initially, at block 402, the controller 204 determines, via the wireless node 208, whether a service message has been received from the vehicle 102 or the mobile device 216. If a service message has been received, the method continues to block 404. Otherwise, if a service message has not been received, the method continues to block 408. At block 404, the controller 204 resets a counter that tracks when service messages have not been received. At block 406, the controller 204 provides a signal so that the switch 210 closes or remains closed. At block 408, the controller 204 increments the counter. At block 410, the controller 204 determines whether the counter satisfies (e.g., is greater than) a time threshold. If the counter satisfies the time threshold, the method continues to block 412. Otherwise, if the counter does not satisfy the time threshold, the method continues to block 406, at which the controller 204 provides a signal so that the switch 210 closes or remains closed. At block 412, the controller 204 does not provide a signal to the switch 210 so that the switch 210 opens or remains open.

The flowchart of FIG. 4 is a method that may be implemented by machine readable instructions that comprise one or more programs that, when executed by the controller 204 to implement the switched power plug 124 of FIGS. 1 and 2. Further, although the example program(s) is/are described with reference to the flowchart illustrated in FIG. 4, many other methods of implementing the example the switched power plug 124 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A plug-in converter comprising:
a wireless node;
a plug;
a power socket;
a switch between the plug and the power socket; and
a controller configured to:
run a timer for a threshold period of time;
reset the timer for each instance in which a service message is wirelessly received at the wireless node; and
cause the switch to electrically couple the plug and the power socket only when the timer is running.

2. The plug-in converter of claim 1, wherein the wireless node is configured to wirelessly receive the service message from a vehicle wireless node.

3. The plug-in converter of claim 1, wherein the wireless node is configured to wirelessly receive the service message from a mobile device.

4. The plug-in converter of claim 1, including a USB port electrically coupled to the switch so that the USB port is electrically coupled to the plug when the switch is closed and electrically isolated from the plug when the switch is open.

5. The plug-in converter of claim 1, wherein the switch is selected from a group comprising a transistor, a mechanical relay, and a solid state relay.

6. A system comprising:
a vehicle including:
a first wireless node electrically coupled to a first vehicle power bus; and
a first power socket electrically coupled to a second vehicle power bus; and
a plug-in converter configured to plug into the first power socket, including
a second wireless node;
a plug;
a second power socket;
a switch; and
a controller configured to: run a timer for a threshold period of time;
reset the timer for each instance in which a service message is wirelessly received at the second wireless node; and
cause the switch to electrically couple the plug and the second power socket only when the timer is running.

7. The system of claim 6, wherein the first vehicle power bus is an ignition power bus or a delayed accessory power bus.

8. The system of claim 6, wherein the second vehicle power bus is a continuous power bus.

9. The system of claim 6, wherein the first wireless node is to broadcast the service message when receiving power from the first power bus.

10. The system of claim 6, including a mobile device configured to, when activate by a user, broadcast the service message.

11. The system of claim 6, wherein the plug-in converter includes a USB port electrically coupled to the switch so that the USB port is electrically coupled to the plug when the switch is closed and electrically isolated from the plug when the switch is open.

12. The system of claim 6, wherein the switch is selected from a group comprising a transistor, a mechanical relay, and a solid state relay.

13. The system of claim 6, wherein the first wireless node electrically coupled to a dome light.

14. A method of operating a plug-in converter, the method comprising:
wirelessly receiving, at a wireless node of the plug-in converter, a service message;
running, via a controller of the plug-in converter, a timer for a threshold period of time;
resetting, via the controller, the timer for each instance in which the service message is received by the wireless node; and
causing, via the controller, a switch of the plug-in converter to electrically couple a plug of the plug-in converter and the a power socket of the plug-in converter only when the timer is running.

* * * * *